United States Patent
Bae et al.

(10) Patent No.: US 9,755,275 B2
(45) Date of Patent: Sep. 5, 2017

(54) RECHARGEABLE LITHIUM BATTERY

(71) Applicant: SAMSUNG SDI CO., LTD., Yongin-si, Gyeonggi-do (KR)

(72) Inventors: Tae-Hyun Bae, Yongin-si (KR); Woo-Cheol Shin, Yongin-si (KR); Myung-Hoon Kim, Yongin-si (KR); Ae-Ran Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/729,000

(22) Filed: Jun. 2, 2015

(65) Prior Publication Data
US 2016/0079626 A1 Mar. 17, 2016

(30) Foreign Application Priority Data

Sep. 16, 2014 (KR) .................. 10-2014-0123030

(51) Int. Cl.
*H01M 10/052* (2010.01)
*H01M 10/0567* (2010.01)
*H01M 10/0525* (2010.01)
*H01M 4/134* (2010.01)
*H01M 4/131* (2010.01)
*H01M 4/133* (2010.01)
*H01M 4/36* (2006.01)
*H01M 4/485* (2010.01)
*H01M 4/38* (2006.01)
(Continued)

(52) U.S. Cl.
CPC ....... *H01M 10/0567* (2013.01); *H01M 4/131* (2013.01); *H01M 4/133* (2013.01); *H01M 4/134* (2013.01); *H01M 4/362* (2013.01); *H01M 4/386* (2013.01); *H01M 4/485* (2013.01); *H01M 4/587* (2013.01); *H01M 10/052* (2013.01); *H01M 10/0525* (2013.01); *H01M 10/0568* (2013.01); *H01M 10/0569* (2013.01); *H01M 2004/027* (2013.01)

(58) Field of Classification Search
CPC ...................... H01M 10/0567; H01M 10/0569
See application file for complete search history.

(56) References Cited

U.S. PATENT DOCUMENTS 6,841,303 B2 1/2005 Park et al.
2007/0009806 A1 1/2007 Kim
(Continued)

FOREIGN PATENT DOCUMENTS

KR 10-0349627 B1 8/2002
KR 10-0726889 B1 6/2007

OTHER PUBLICATIONS

EPO Search Report dated Feb. 1, 2016, for corresponding European Patent application 15169979.0, (7 pages).
(Continued)

*Primary Examiner* — Olatunji Godo
(74) *Attorney, Agent, or Firm* — Lewis Roca Rothgerber Christie LLP

(57) ABSTRACT

A rechargeable lithium battery includes a negative electrode including a negative active material including a Si-based material, a positive electrode, and an electrolyte including a lithium salt, an organic solvent, and an additive including lithium triflate and fluoroethylene carbonate. Embodiments of the rechargeable lithium battery have excellent irreversible characteristics and cycle-life characteristics.

8 Claims, 9 Drawing Sheets

(51) Int. Cl.
*H01M 4/587* (2010.01)
*H01M 10/0568* (2010.01)
H01M 4/02 (2006.01)
H01M 10/0569 (2010.01)

(56) References Cited

U.S. PATENT DOCUMENTS

2009/0068565 A1    3/2009   Lee
2011/0123869 A1*   5/2011   Choi ................ H01M 10/0525
                                                                                                  429/325
2012/0177988 A1    7/2012   Fujii et al.

OTHER PUBLICATIONS

Korean Patent Abstracts for Korean Publication No. 10-2001-0104955 A, Corresponding to Korean Patent No. 10-0349627 B1, 1 Page.
Korean Patent Abstracts for Korean Publication No. 10-2007-0012094 A, Corresponding to Korean Patent No. 10-0726889 B1, 1 Page.

* cited by examiner

RECHARGEABLE LITHIUM BATTERY

CROSS-REFERENCE TO RELATED APPLICATION

This application claims priority to and the benefit of Korean Patent Application No. 10-2014-0123030 filed in the Korean Intellectual Property Office on Sep. 16, 2014, the entire content of which is incorporated herein by reference.

BACKGROUND

1. Field

A rechargeable lithium battery is disclosed.

2. Description of the Related Art

A lithium polymer battery may be manufactured to have various shapes, such as a thin film, and accordingly, may be applied to a small information technology (IT) device, such as a smart phone, a tablet PC, a net book, and the like.

As such IT devices gradually require higher and higher performance, the battery used therein is expected to have higher capacity. As the rechargeable lithium battery is expected to have higher capacity, graphite as a negative active material may not realize sufficient or suitable high-capacity as expected for the rechargeable lithium battery.

Accordingly, a silicon-based active material has drawn attention as a negative active material due to its higher charge and discharge capacity than the graphite. However, the silicon-based active material has a sharp cycle-life deterioration, since an electrolyte is exhausted due to a reaction of silicon in the negative electrode with the electrolyte as a result of the repeated charge and discharge cycles.

SUMMARY

One embodiment generally relates to a rechargeable lithium battery having excellent irreversible characteristics and cycle-life characteristics.

In one embodiment, a rechargeable lithium battery includes a negative electrode including a negative active material including a Si-based material; a positive electrode; and an electrolyte including a lithium salt, an organic solvent, and an additive including lithium triflate and fluoroethylene carbonate.

The lithium triflate may be included in the electrolyte in an amount of about 0.5 parts by weight to about 10 parts by weight based on 100 parts by weight of the organic solvent. In some embodiments, the lithium triflate may be included in the electrolyte in an amount of about 3 parts by weight to about 5 parts by weight based on 100 parts by weight of the organic solvent.

The fluoroethylene carbonate may be included in the electrolyte in an amount of about 5 parts by weight to 20 parts by weight based on 100 parts by weight of the organic solvent. In some embodiments, the fluoroethylene carbonate may be included in the electrolyte in an amount of about 10 parts by weight to 20 parts by weight based on 100 parts by weight of the organic solvent.

A weight ratio of the lithium triflate to the fluoroethylene carbonate may be about 1:2 to about 1:10.

The Si-based material may include Si, $SiO_x$, a Si—Y alloy, a Si—C composite, or a combination thereof, where $0<x \leq 2$ and Y is selected from an alkali metal, an alkaline-earth metal, Group 13 to 16 elements, a transition metal, a rare earth element, and a combination thereof, but not Si.

Other embodiments are included in the following detailed description.

A rechargeable lithium battery according to embodiment of the present disclosure has excellent irreversible characteristics and cycle-life characteristics.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Figure 1:
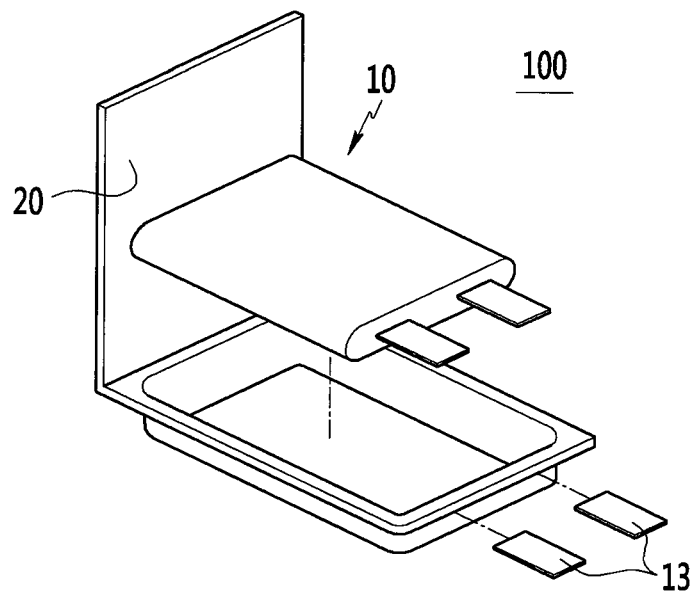
FIG. 1 is a schematic view showing a rechargeable lithium battery according to one embodiment.

Hereinafter, embodiments of the present invention are described in more detail. However, these embodiments are exemplary, and this disclosure is not limited thereto. As those skilled in the art would recognize, the invention may be embodied in many different forms. Also, in the context of the present application, when a first element is referred to as being "on" a second element, it can be directly on the second element or be indirectly on the second element with one or more intervening elements interposed therebetween. Like reference numerals designate like elements throughout the specification.

Hereinafter, a rechargeable lithium battery according to one embodiment is described with reference to FIG. 1.

FIG. 1 is a schematic view showing a rechargeable lithium battery according to one embodiment.

Referring to FIG. 1, a rechargeable lithium battery 100 according to one embodiment includes an electrode assembly 10, a battery case 20 housing the electrode assembly 10, and an electrode tab 13 playing a role of (e.g., providing) an electrical channel for externally inducing a current formed in the electrode assembly 10. Both sides of the battery case 20 are overlapped and sealed. In addition, an electrolyte is injected into the battery case 20 housing the electrode assembly 10.

The electrode assembly 10 includes a positive electrode, a negative electrode facing the positive electrode and a separator interposed between the negative electrode and the positive electrode, wherein the electrolyte is impregnated in the positive electrode, the negative electrode and the separator.

The electrolyte may include a lithium salt, an organic solvent, and an additive, but the electrolyte is not limited thereto.

The additive may include lithium triflate and fluoroethylene carbonate, but the additive is not limited thereto.

The lithium triflate may be represented by Chemical Formula 1.

Chemical Formula 1

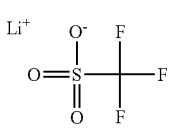

When the lithium triflate is added to an electrolyte, a stable SEI (solid electrolyte interface) film may be formed on a surface of the negative electrode. The SEI film may increase the amount of reversible lithium ions (e.g., lithium ions that can be reversibly intercalated and de-intercalated) and suppress, reduce, or prevent a reaction of the electrolyte with a Si-based material (Si-based active material) in the negative electrode and, resultantly, may improve battery performance, such as irreversible characteristics and cycle-life characteristics.

For example, the reaction of a lithium salt in the electrolyte with the Si-based material of the negative electrode may occur on the surface of the Si-based material. The lithium salt is illustrated by using $LiPF_6$ as an example, and the Si-based material is illustrated by using $SiO_2$ as an example, but the kinds of lithium salt and Si-based material that may react with one another are not limited thereto.

1) $LiPF_6(Li^+ + PF_6^-) \rightarrow LiF + PF_5$
2) $PF_5 + H_2O \rightarrow PF_3O + 2HF$
3) $HF + Li + e^- \rightarrow LiF + \frac{1}{2}H_2$
4) $2HF + Li_2CO_3 \rightarrow 2LiF + H_2CO_3$
5) $SiO_2 + 4HF \rightarrow SiF_4 + 2H_2O$
6) $SiO_2 + 6HF \rightarrow H_2SiF_6 + 2H_2O$ The mechanisms through which the electrolyte reacts with the Si-based material of the negative electrode may deteriorate battery performance, but, in one embodiment, the above lithium triflate included in an electrolyte bonds to (or reacts with) HF in the electrolyte, and thus, may suppress, reduce, or prevent the Si-based material from bonding to (or reacting with) the HF, for example, as shown in the reactions 5) and 6), thereby improving irreversible characteristics and cycle-life characteristics of a rechargeable lithium battery.

The lithium triflate may be included in the electrolyte in an amount of about 0.5 parts by weight to about 10 parts by weight, for example, about 3 parts by weight to about 5 parts by weight based on 100 parts by weight of the organic solvent. When the lithium triflate is included within any of the foregoing ranges, the lithium triflate may be more easily bonded with HF and better suppress, reduce, or prevent a reaction of the electrolyte with the Si-based material of the negative electrode.

In the rechargeable lithium battery, the fluoroethylene carbonate decomposes before other carbonates, such as ethylene carbonate, when used as an organic solvent, and the fluoroethylene carbonate may form a stable SEI film on the surface of the negative electrode, and thus, further improve performance of a rechargeable lithium battery.

The fluoroethylene carbonate may be included in the electrolyte in an amount of about 5 parts by weight to 20 parts by weight, for example, 10 parts by weight to 20 parts by weight based on 100 parts by weight of the organic solvent. When the fluoroethylene carbonate is included within any of the foregoing ranges, irreversible characteristics and cycle-life characteristics of a rechargeable lithium battery may be improved.

The additive may be prepared by mixing the lithium triflate and the fluoroethylene carbonate in a weight ratio of about 1:2 to about 1:10, for example, about 1:7 to about 1:10. When the lithium triflate and the fluoroethylene carbonate are mixed within any of the foregoing weight ratio ranges, a stable and firm SEI film is formed on the surface of the negative electrode, and thus, irreversible characteristics and cycle-life characteristics of a rechargeable lithium battery may be largely or substantially improved.

The additive may further include vinylethylene carbonate, propane sultone, succinonitrile, adiponitrile, $LiBF_4$, or a combination thereof, in addition to the above-described components of the additive.

The organic solvent of the electrolyte serves as a medium for transmitting ions taking part in the electrochemical reaction of a battery. The organic solvent may be selected from a carbonate-based (e.g., a linear carbonate and/or a cyclic carbonate), ester-based, an ether-based, a ketone-based, an alcohol-based and aprotic solvent, but the organic solvent is not limited thereto.

The carbonate based organic solvent may include, for example dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and/or the like.

For example, when the linear carbonate is mixed with the cyclic carbonate, a solvent having a high dielectric constant and a low viscosity may be provided. In some embodiments, the cyclic carbonate and the linear carbonate are mixed together in a volume ratio of about 1:1 to about 1:9.

The ester-based organic solvent may include, for example, methylacetate, ethylacetate, n-propylacetate, dimethylacetate, methylpropionate, ethylpropionate, γ-butyrolactone, decanolide, valerolactone, mevalonolactone, caprolactone, and/or the like. The ether-based organic solvent may include, for example, dibutylether, tetraglyme, diglyme, dimethoxyethane, 2-methyltetrahydrofuran, tetrahydrofuran, and/or the like. The ketone-based solvent may include, for example, cyclohexanone, and/or the like. The alcohol-based solvent may include, for example, ethyl alcohol, isopropyl alcohol, and/or the like.

The organic solvent may be used singularly or in a mixture. When the organic solvent is used in a mixture, the mixture ratio can be controlled in accordance with a suitable or desirable battery performance.

The lithium salt of the electrolyte is dissolved in the organic solvent, supplies lithium ions in the rechargeable lithium battery, basically operates the rechargeable lithium battery, and improves lithium ion transportation between positive and negative electrodes therein.

The lithium salt may include, for example, $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, e.g., an integer of 1 to 20), LiCl, LiI, $LiB(C_2O_4)_2$ (lithium bisoxalatoborate (LiBOB)), or a combination or mixture thereof.

The lithium salt may be used in a concentration of about 0.1 M to about 2.0 M. When the lithium salt is included within the above concentration range, an electrolyte may have improved performance and lithium ion mobility due to suitable or optimal electrolyte conductivity and viscosity.

The negative electrode includes a negative current collector and a negative active material layer thereon.

The current collector may include a copper foil, a nickel foil, a stainless steel foil, a titanium foil, a nickel foam, a copper foam, a polymer substrate coated with a conductive metal, or a combination thereof, but the current collector is not limited thereto.

The negative active material layer may include a negative active material, and, optionally, a conductive material and/or a binder.

According to one embodiment, the negative active material may include a Si-based material. When the above additive is added to an electrolyte, a stable SEI film is formed on the surface of the negative electrode and suppresses, reduces, or prevents a reaction of the electrolyte with the Si-based material, and thus, may secure excellent irreversible characteristics and cycle-life characteristics of a rechargeable lithium battery.

The Si-based material may include Si, $SiO_x$ ($0<x≤2$), a Si—Y alloy (where Y is an element selected from an alkali metal, an alkaline-earth metal, Group 13 to 16 elements, transition metal, a rare earth element, and a combination thereof, but not Si), a Si—C composite, or a combination thereof, but the Si-based material is not limited thereto. The Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po and a combination thereof.

The negative active material may further include a carbon-based material, a lithium metal alloy, a transition metal oxide, or a combination thereof, in addition to the Si-based material.

The carbon-based material may include crystalline carbon, amorphous carbon, or a combination thereof. The crystalline carbon may include graphite. Examples of the graphite may include non-shaped, sheet-shaped, flake-shaped, spherical shaped, or fiber-shaped natural graphite or artificial graphite. The amorphous carbon may include soft carbon, hard carbon, a mesophase pitch carbonized product, fired coke, and/or the like.

The lithium metal alloy may include an alloy of lithium and a metal selected from Na, K, Rb, Cs, Fr, Be, Mg, Ca, Sr, Si, Sb, Pb, In, Zn, Ba, Ra, Ge, Al and Sn.

The transition metal oxide may include vanadium oxide, lithium vanadium oxide, and/or the like.

The binder improves binding properties of negative active material particles with one another and with a current collector. Examples of the binder may include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but the binder is not limited thereto.

The conductive material improves conductivity of an electrode. Any suitable electrically conductive material may be used as a conductive material, unless it causes it causes a chemical change in the battery. Examples of the conductive material may include a carbon-based material, such as natural graphite, artificial graphite, carbon black, acetylene black, ketjen black, a carbon fiber and/or the like; a metal-based material, such as a metal powder or a metal fiber and/or the like of copper, nickel, aluminum, silver, and/or the like; a conductive polymer such as a polyphenylene derivative and/or the like; or a mixture thereof.

The positive electrode may include a positive current collector and a positive active material layer on or formed on the positive current collector. In some embodiments, the positive active material layer includes a positive active material, and, optionally, a binder and a conductive material.

The positive current collector may include Al (aluminum), but the positive current collector is not limited thereto.

The positive active material may include a compound capable of intercalating and deintercalating lithium. For example, at least one composite oxide of lithium and a metal of cobalt, manganese, nickel, or a combination thereof may be used, and examples thereof may include a compound represented by one of the following chemical formulae:

$Li_aA_{1-b}B_bD_2$ ($0.90≤a≤1.8$ and $0≤b≤0.5$); $Li_aE_{1-b}B_bO_{2-c}D_c$ ($0.90≤a≤1.8$, $0≤b≤0.5$, $0≤c≤0.05$); $Li_aE_{2-b}B_bO_{4-c}D_c$ ($0.90≤a≤1.8$, $0≤b≤0.5$, $0≤c≤0.05$); $Li_aNi_{1-b-c}Co_bB_cD_\alpha$ ($0.90≤a≤1.8$, $0≤b≤0.5$, $0≤c≤0.05$, $0<\alpha≤2$); $Li_aNi_{1-b-c}Co_bB_cO_{2-\alpha}F_\alpha$ ($0.90≤a≤1.8$, $0≤b≤0.5$, $0≤c≤0.05$, $0<\alpha<2$); $Li_aNi_{1-b-c}Co_bB_cO_{2-\alpha}F_2$ ($0.90≤a≤1.8$, $0≤b≤0.5$, $0≤c≤0.05$, $0<\alpha<2$); $Li_aNi_{1-b-c}Mn_bB_cD_\alpha$ ($0.90≤a≤1.8$, $0≤b≤0.5$, $0≤c≤0.05$, $0<\alpha≤2$); $Li_aNi_{1-b-c}Mn_bB_cO_{2-\alpha}F_\alpha$ ($0.90≤a≤1.8$, $0≤b≤0.5$, $0≤c≤0.05$, $0<\alpha<2$); $Li_aNi_{1-b-c}Mn_bB_cO_{2-\alpha}F_2$ ($0.90≤a≤1.8$, $0≤b≤0.5$, $0≤c≤0.05$, $0<\alpha<2$); $Li_aNi_bE_cG_dO_2$ ($0.90≤a≤1.8$, $0≤b≤0.9$, $0≤c≤0.5$, $0.001≤d≤0.1$); $Li_aNi_bCo_cMn_dG_eO_2$ ($0.90≤a≤1.8$, $0≤b≤0.9$, $0≤c≤0.5$, $0≤d≤0.5$, $0.001≤e≤0.1$); $Li_aNiG_bO_2$ ($0.90≤a≤1.8$, $0.001≤b≤0.1$); $Li_aCoG_bO_2$ ($0.90≤a≤1.8$, $0.001≤b≤0.1$); $Li_aMnG_bO_2$ ($0.90≤a≤1.8$, $0.001≤b≤0.1$); $Li_aMn_2G_bO_4$ ($0.90≤a≤1.8$, $0.001≤b≤0.1$); $QO_2$; $QS_2$; $LiQS_2$; $V_2O_5$; $LiIO_2$; $LiNiVO_4$; $Li_{(3-f)}J_2(PO_4)_3$ ($0≤f≤2$); $Li_{(3-f)}Fe_2(PO_4)_3$ ($0≤f≤2$); and $LiFePO_4$.

In the above chemical formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The binder improves binding properties of positive active material particles with one another and with a current collector. Examples of the binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but the binder is not limited thereto.

The conductive material improves conductivity of an electrode. Any suitable electrically conductive material may be used as a conductive material, unless it causes a chemical change in the battery. Examples of the conductive material may include one or more of natural graphite, artificial graphite, carbon black, acetylene black, ketjen black, a carbon fiber, copper, a metal powder, a metal fiber or the like of nickel, aluminum, silver, and/or the like, and/or a conductive material (e.g., a conductive polymer) such as a polyphenylene derivative and/or the like.

The negative electrode and the positive electrode may be manufactured by a method including mixing an active material, a conductive material, and a binder to form an active material composition and coating the composition on a current collector. The electrode manufacturing method should be apparent to one of ordinary skill in the art, and thus, does not need to be described in further detail here. The solvent includes N-methylpyrrolidone and the like, but the solvent is not limited thereto.

The separator may include any suitable materials available in the art of lithium batteries as long as the separator separates the negative electrode from the positive electrode and provides a transporting passage for lithium ion. In other words, the separator may have a low resistance to ion transportation and excellent impregnation characteristics for an electrolyte solution. For example, the separator may include one or more selected from a glass fiber, polyester, polyethylene, polypropylene, polytetrafluoroethylene (PTFE), or a combination thereof. The separator may have a form of a non-woven fabric or a woven fabric. For example, a polyolefin-based polymer separator such as polyethylene, polypropylene or the like is mainly or primarily used for a lithium ion battery. In order to ensure suitable heat resistance or mechanical strength of the separator, a coated separator including a ceramic component or a polymer material may be used. For example, the separator may have a mono-layered or multi-layered structure.

Hereinafter, certain embodiments are illustrated in more detail with reference to examples. However, these examples are exemplary, and the present disclosure is not limited thereto.

Furthermore, what is not described or illustrated in this disclosure may be sufficiently understood by those who have knowledge in this field.

Example 1

(Manufacture of Positive Electrode)

$LiCoO_2$, polyvinylidene fluoride (PVdF) and carbon black were mixed in a weight ratio of 92:4:4 and, then, dispersed into N-methyl-2-pyrrolidone to prepare a slurry. The slurry was coated on a 20 μm-thick aluminum foil and, then, dried and compressed to manufacture a positive electrode.

(Manufacture of Negative Electrode)

On the other hand, a Si—Fe alloy (CV4, 3M) and polyvinylidene fluoride (PVdF) were mixed in a weight ratio of 92:8 and, then, dispersed into N-methyl-2-pyrrolidone to prepare a slurry. The slurry was coated on a 15 μm-thick copper foil and, then, dried and compressed to manufacture a negative electrode.

(Preparation of Electrolyte Solution)

An electrolyte solution was prepared by mixing ethylene carbonate (EC), ethylmethyl carbonate (EMC) and diethyl carbonate (DEC) in a volume ratio of 3:5:2 to obtain an organic solvent and dissolving 1.15 M $LiPF_6$ in the organic solvent and, then, adding thereto 10 parts by weight of fluoroethylene carbonate and 1 part by weight of lithium triflate based on 100 parts by weight of the organic solvent.

(Manufacture of Rechargeable Lithium Battery Cell)

The positive and negative electrodes and a 20 μm-thick three-layered separator formed of polypropylene/polyethylene/polypropylene were spirally wound to manufacture an electrode assembly. Subsequently, the electrode assembly was housed in a battery case, and the electrolyte solution was injected into the battery case to manufacture a rechargeable lithium battery cell.

Example 2

A rechargeable lithium battery cell was manufactured according to the method of Example 1 except for using 2 parts by weight of the lithium triflate instead of 1 part by weight of the lithium triflate to prepare the electrolyte solution.

Example 3

A rechargeable lithium battery cell was manufactured according to the method of Example 1 except for using 3 parts by weight of the lithium triflate instead of 1 part by weight of the lithium triflate to prepare the electrolyte solution.

Example 4

A rechargeable lithium battery cell was manufactured according to the method of Example 1 except for using 5 parts by weight of the lithium triflate instead of 1 part by weight of the lithium triflate to prepare the electrolyte solution.

Example 5

A rechargeable lithium battery cell was manufactured according to the method of Example 1 except for using 7 parts by weight of the fluoroethylene carbonate and 5 parts by weight of the lithium triflate instead of 10 parts by weight of the fluoroethylene carbonate and 1 part by weight of the lithium triflate to prepare the electrolyte solution.

Example 6

A rechargeable lithium battery cell was manufactured according to the method of Example 1 except for using 5 parts by weight of the fluoroethylene carbonate and 7 parts by weight of the lithium triflate instead of 10 parts by weight of the fluoroethylene carbonate and 1 part by weight of the lithium triflate to prepare the electrolyte solution.

Comparative Example 1

A rechargeable lithium battery cell was manufactured according to the method of Example 1 except that no lithium triflate was added to prepare the electrolyte solution.

Comparative Example 2

A rechargeable lithium battery cell was manufactured according to the method of Example 2 except that no fluoroethylene carbonate was added to prepare the electrolyte solution.

Comparative Example 3

A rechargeable lithium battery cell was manufactured according to the method of Example 1 except that the negative electrode was manufactured as follows, instead of being manufactured as described with respect to Example 1, and no lithium triflate was added to prepare the electrolyte solution.

(Manufacture of Negative Electrode)

Artificial graphite (MITSUBISHI, MC20) and polyvinylidene fluoride (PVdF) were mixed in a weight ratio of 92:8 and, then, dispersed into N-methyl-2-pyrrolidone to prepare a slurry. The slurry was coated on a 15 μm-thick copper foil and, then, dried and compressed to manufacture a negative electrode.

Comparative Example 4

A rechargeable lithium battery cell was manufactured according to the method of Example 1 except for using the negative electrode according to Comparative Example 3, instead of the negative electrode according to Example 1, and no fluoroethylene carbonate was added to prepare the electrolyte solution.

Comparative Example 5

A rechargeable lithium battery cell was manufactured according to the method of Example 1 except for using the negative electrode according to Comparative Example 3 instead of the negative electrode according to Example 1.

The compositions of the rechargeable lithium battery cells according to Examples 1 to 6 and Comparative Examples 1 to 5 are summarized and provided in the following Table 1.

TABLE 1

| | | Electrolyte solution additive (parts by weight) | |
|---|---|---|---|
| | Negative active material | lithium triflate | fluoroethylene carbonate |
| Example 1 | Si-based material | 1 | 10 |
| Example 2 | Si-based material | 2 | 10 |
| Example 3 | Si-based material | 3 | 10 |
| Example 4 | Si-based material | 5 | 10 |
| Example 5 | Si-based material | 5 | 7 |
| Example 6 | Si-based material | 7 | 5 |
| Comparative Example 1 | Si-based material | 0 | 10 |
| Comparative Example 2 | Si-based material | 2 | 0 |
| Comparative Example 3 | graphite | 0 | 10 |
| Comparative Example 4 | graphite | 1 | 0 |
| Comparative Example 5 | graphite | 1 | 10 |

Evaluation 1: Irreversible Characteristics

Irreversible characteristics of the negative electrodes according to Example 1 and Comparative Examples 1, 3 and 5 were evaluated by using the respective negative electrodes as a working electrode and a lithium metal as a reference electrode and a counter electrode and performing a cyclic voltammetry analysis from 0 V to 3 V at a rate of 1 mV/s. The results of the cyclic voltammetry analyses are shown in FIGS. 2 to 5.

FIGS. 2 to 5 are graphs showing cyclic voltammetry analyses of the negative electrodes according to Example 1, Comparative Examples 1, 3 and 5, respectively, using the lithium metal as the reference/counter electrode. In FIGS. 2 to 5, a number from 1 to 5 in the legend indicates a cycle number.

Figure 2:
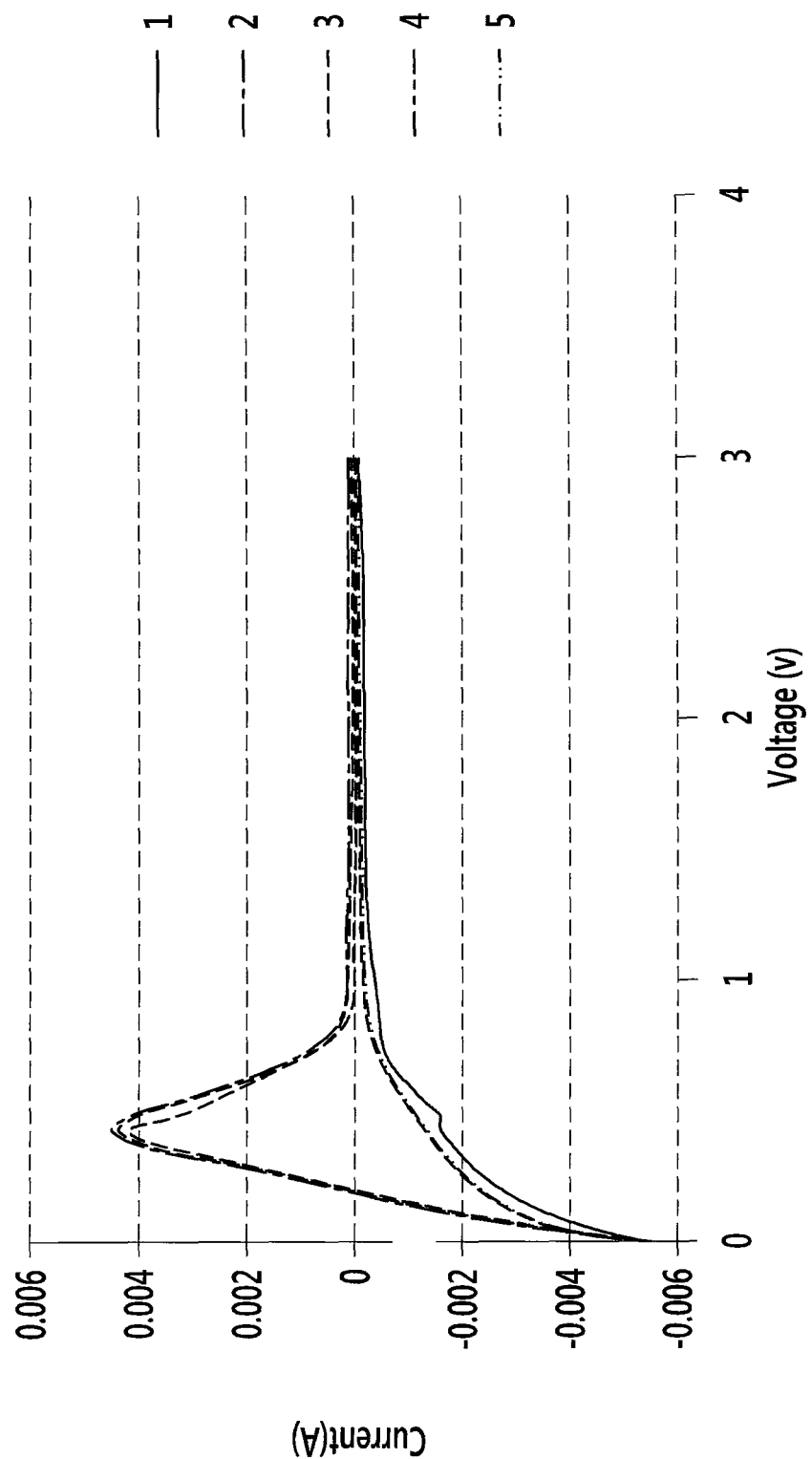
FIGS. 2 to 5 are cyclic voltammetry analyses graphs for negative electrodes according to Example 1, Comparative Example 1, Comparative Example 3 and Comparative Example 5, respectively, using lithium metal as a reference/counter electrode.
Figure 3:
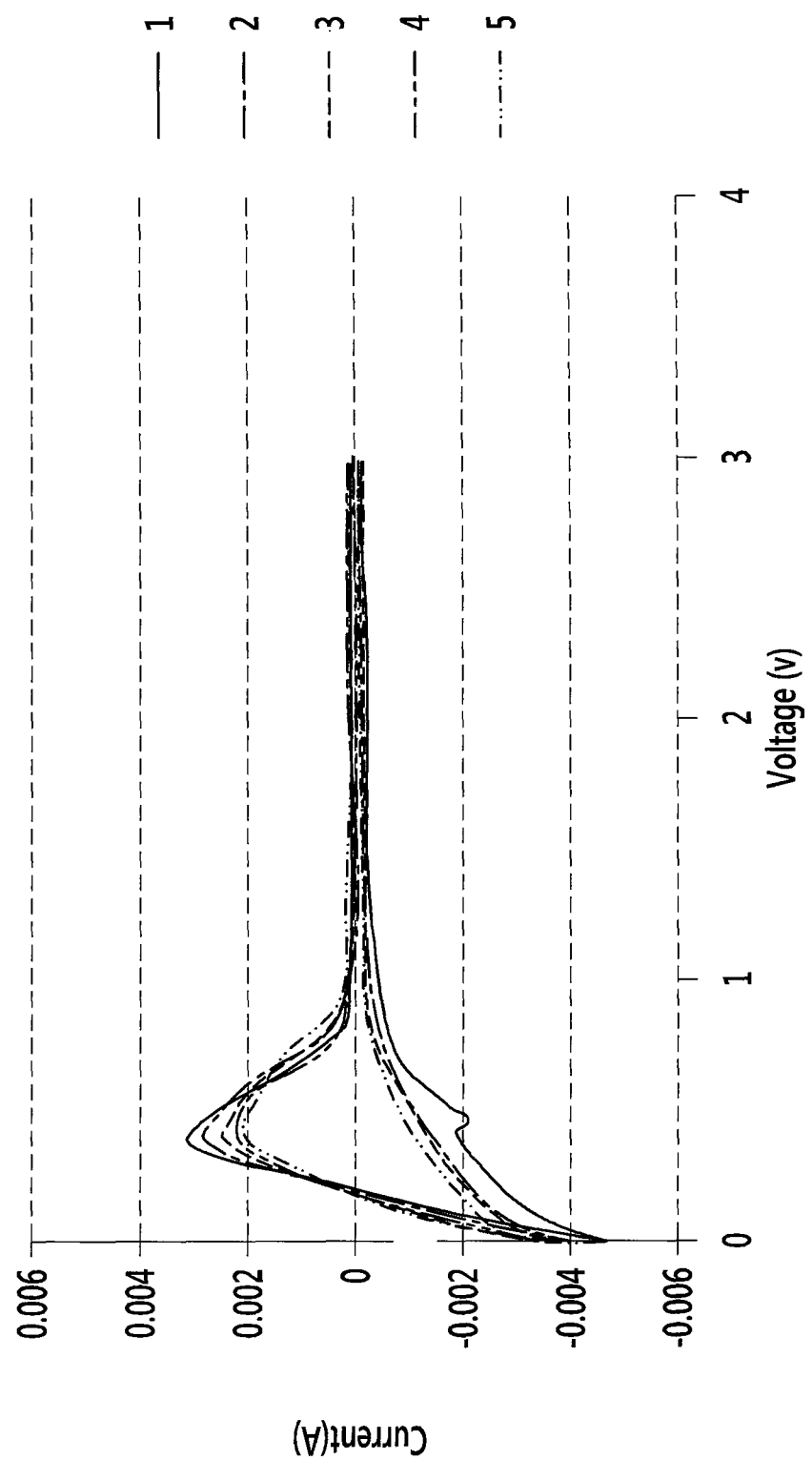

Referring to FIGS. 2 and 3, FIG. 2, which is relevant to Example 1, shows that a current peak did not decrease in a region of about 0 V to 1 V as a result of the repeated cycles, while FIG. 3, which is relevant to Comparative Example 1, shows that a current peak decreased as a result of the repeated cycles. Accordingly, the electrolyte solution prepared by adding lithium triflate according to Example 1 was observed to include more reversible lithium ions (e.g., lithium ions that can be reversibly intercalated and de-intercalated) than the electrolyte solution according to Comparative Example 1, which was prepared without adding lithium triflate (the electrolyte solution did not include lithium triflate).

Figure 4:
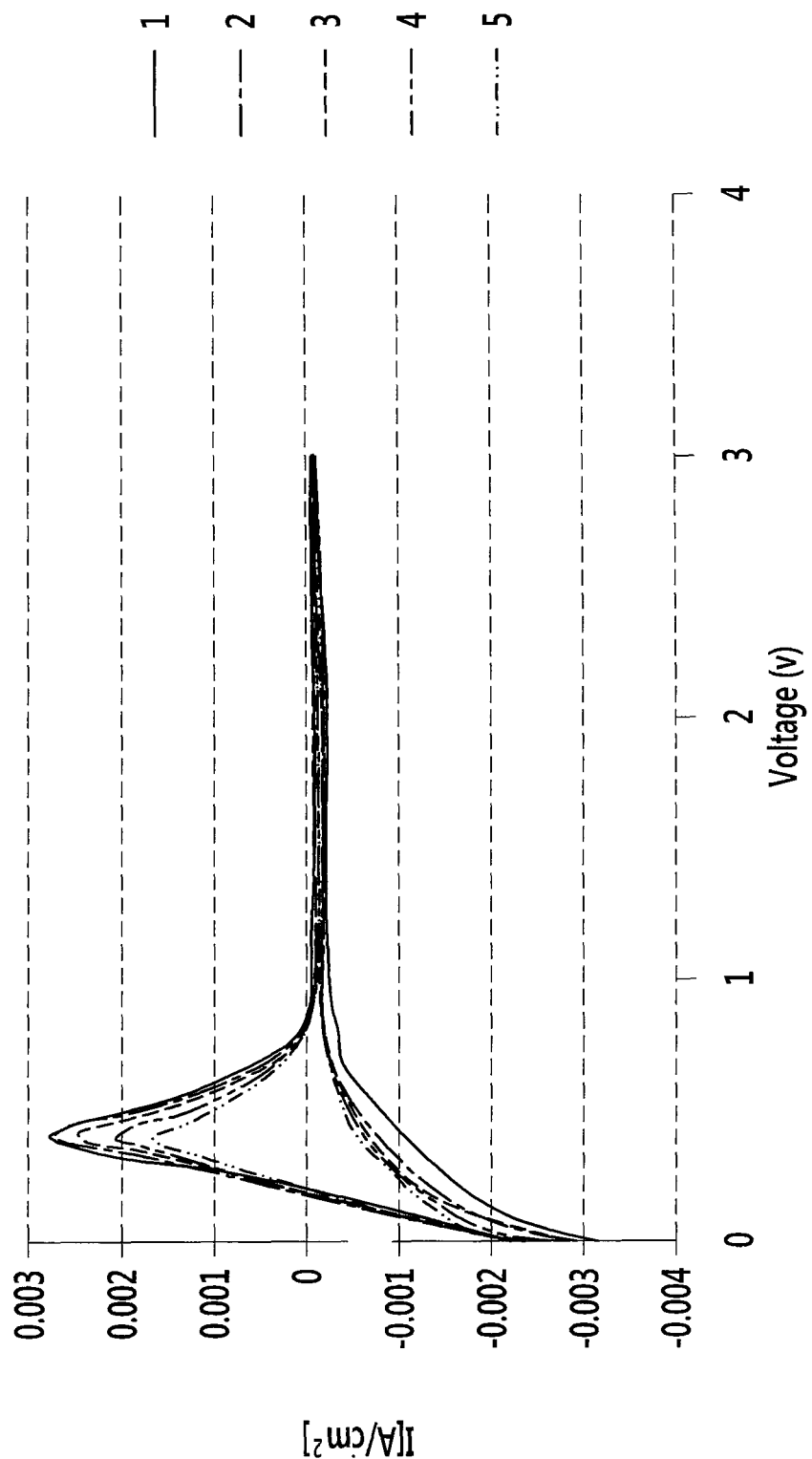
Figure 5:
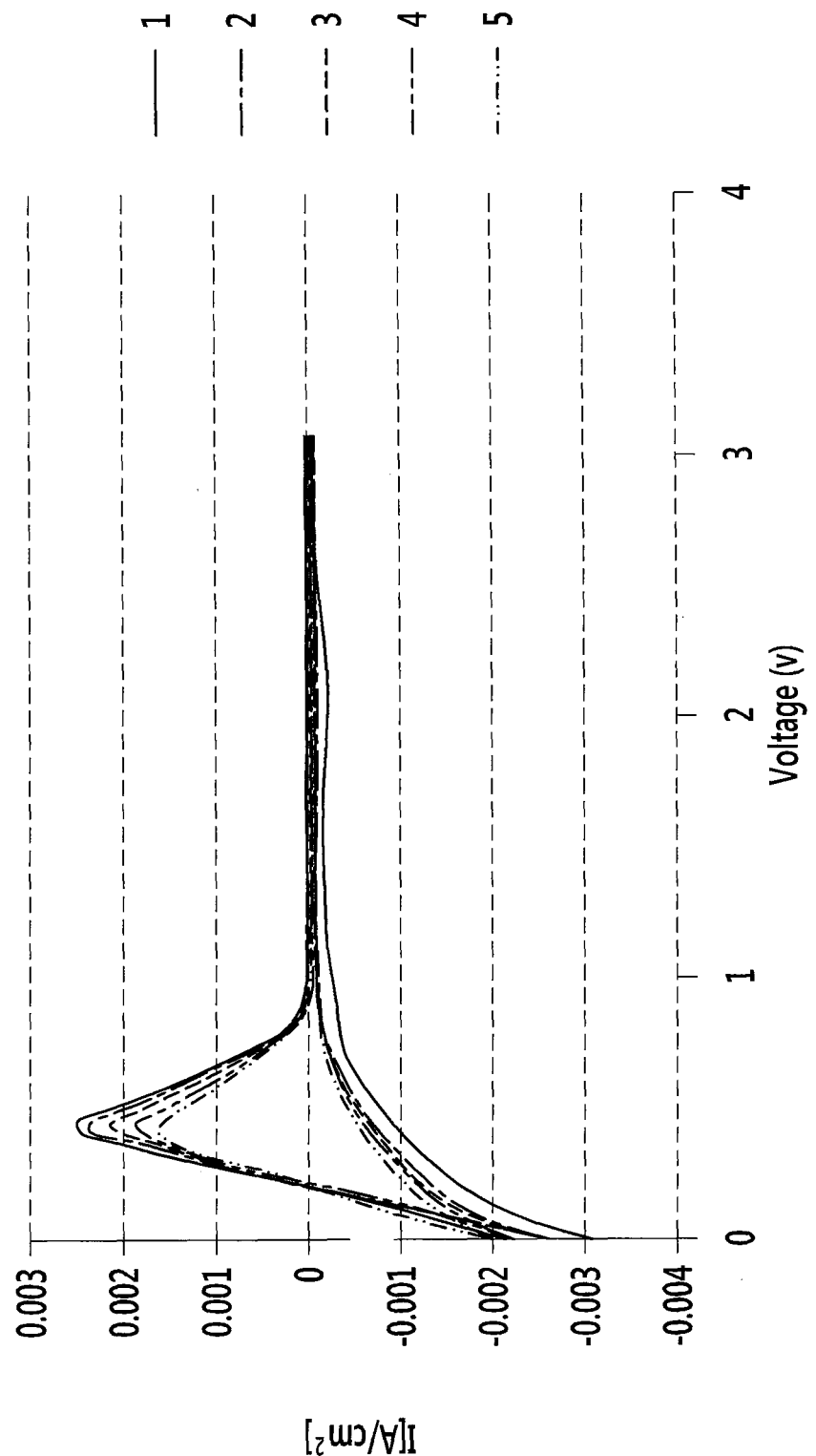

In addition, referring to FIGS. 4 and 5, when graphite was used instead of a Si-based material as a negative active material, Comparative Example 5, in which lithium triflate was added to the electrolyte solution, showed improved irreversible characteristics as compared with Comparative Example 3, in which no lithium triflate was added to the electrolyte solution (the electrolyte solution did not include lithium triflate). However, comparing FIGS. 4 and 5 with FIGS. 2 and 3, when a Si-based negative active material was used instead of graphite, an effect of improving irreversible characteristics by addition of lithium triflate to the electrolyte solution was much larger.

Evaluation 2: Cycle-Life Characteristics

The rechargeable lithium battery cells according to Examples 1 to 6 and Comparative Examples 1 to 5 were repetitively charged at 4.4 V and 0.7 C and discharged at 2.75 V and 0.5 C at room temperature 100 times, and their discharge capacity depending on a number of cycles was evaluated. The results are shown in FIGS. 6 to 9.

Figure 6:
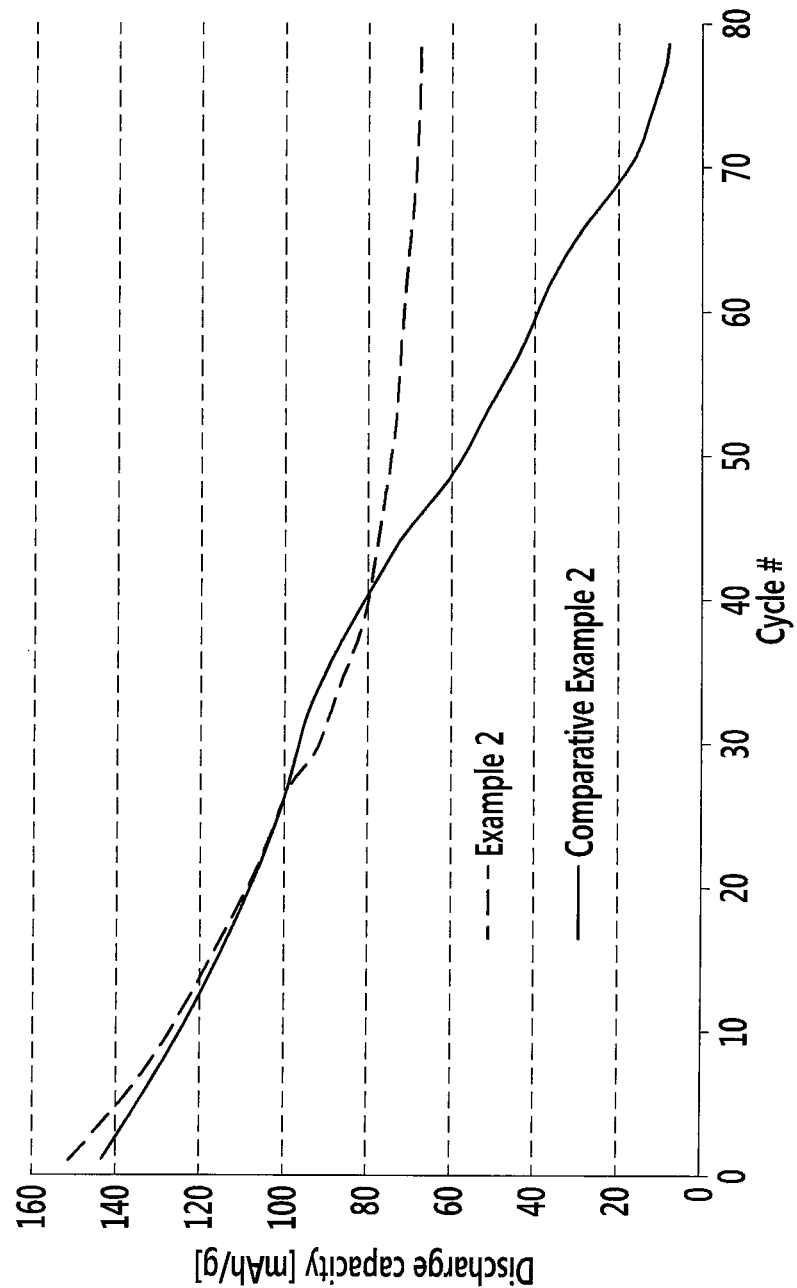
FIG. 6 is a graph showing cycle-life characteristics of the rechargeable lithium battery cells according to Example 2 and Comparative Example 2.
Figure 7:
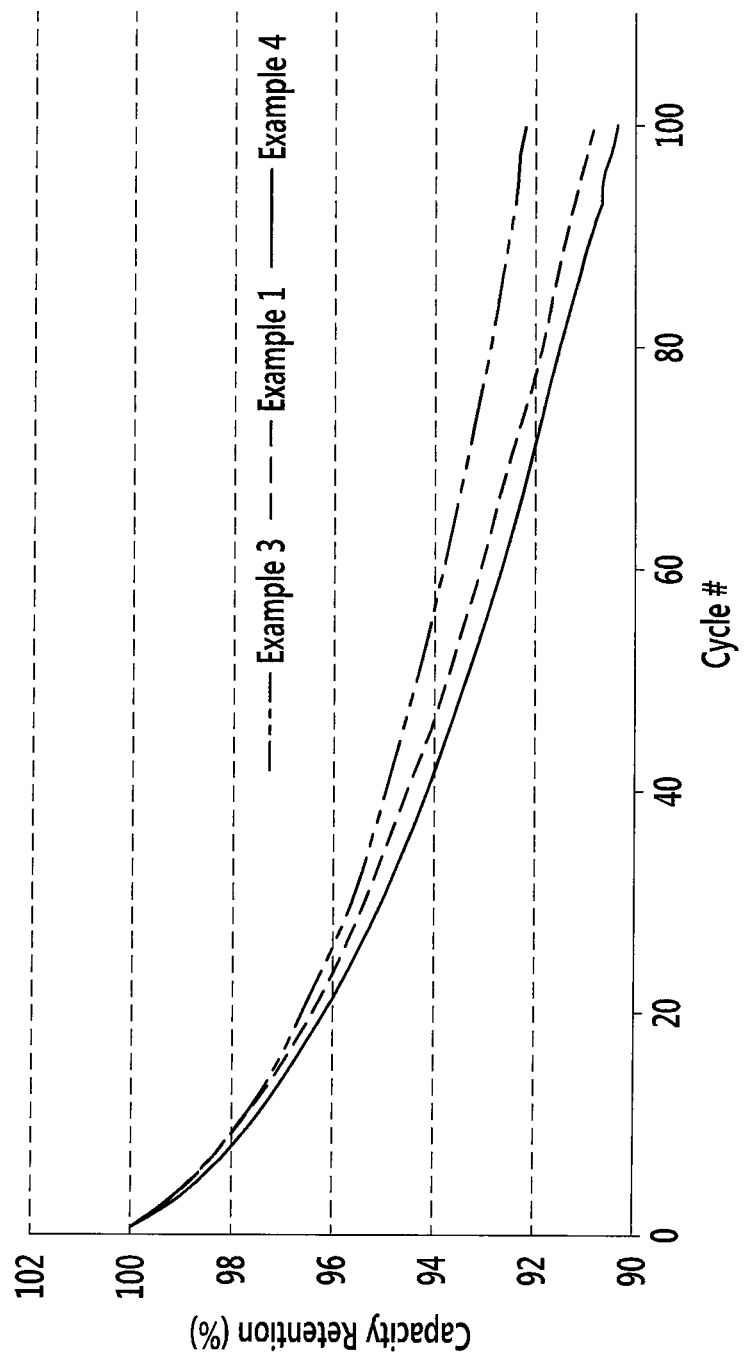
FIG. 7 is a graph showing cycle-life characteristics of the rechargeable lithium battery cells according to Examples 1, 3 and 4.
Figure 8:
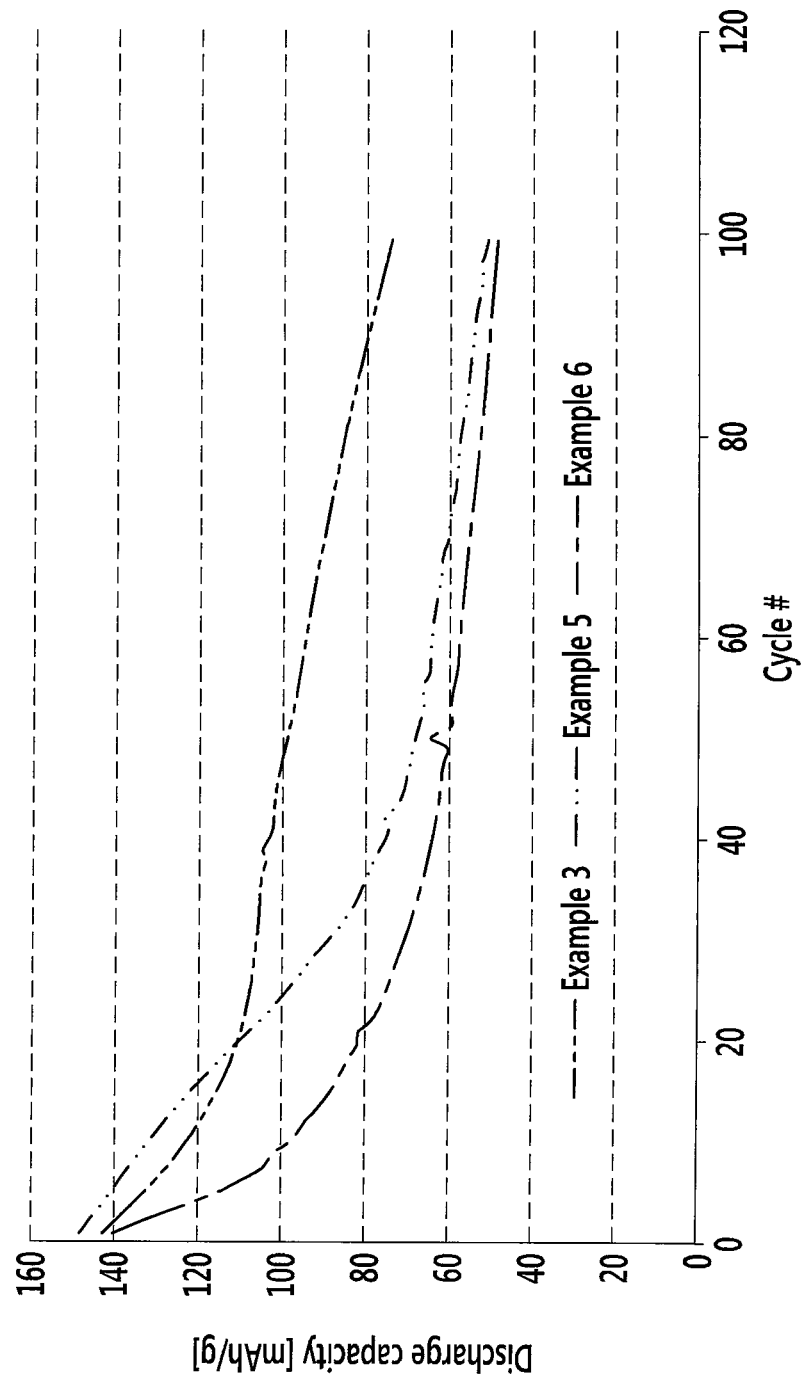
FIG. 8 is a graph showing cycle-life characteristics of the rechargeable lithium battery cells according to Examples 3, 5 and 6.
Figure 9:
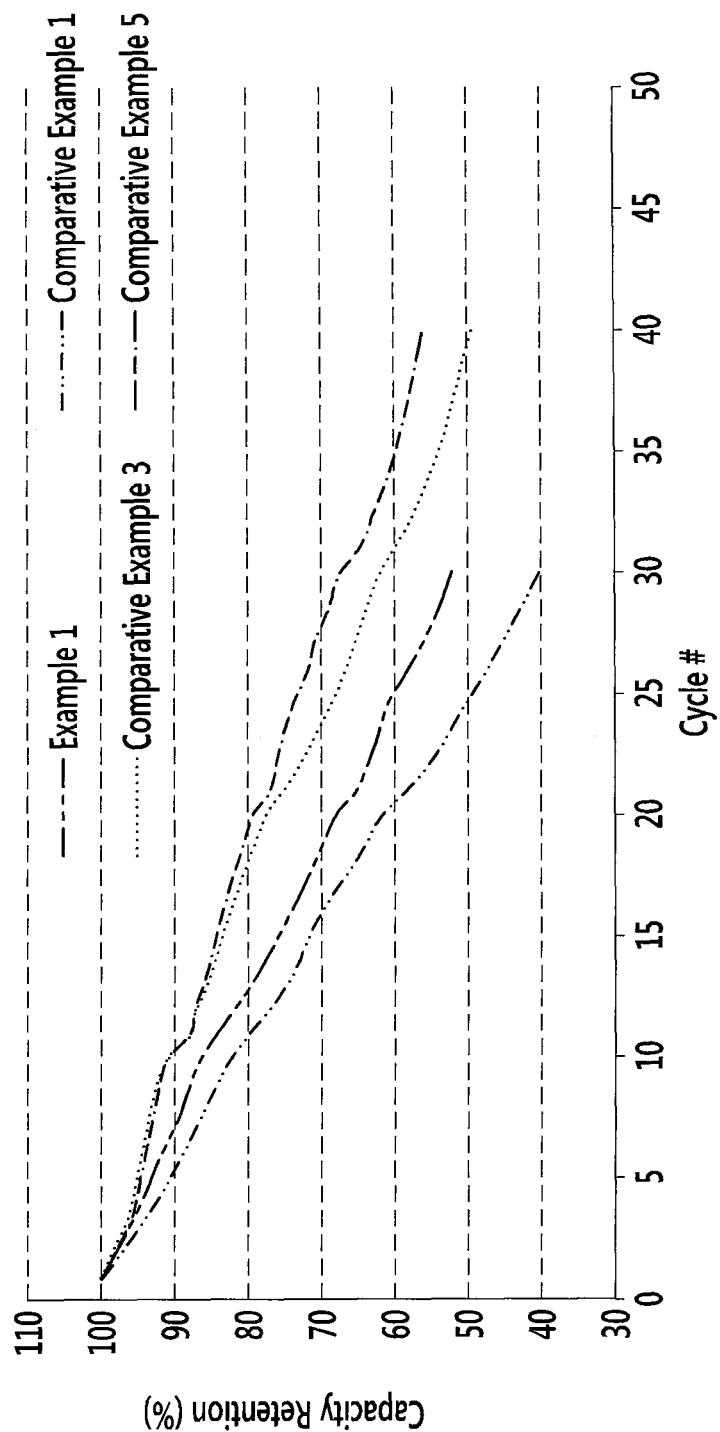
FIG. 9 is a graph showing cycle-life characteristics of the rechargeable lithium battery cells according to Example 1 and Comparative Examples 1, 3 and 5.

FIG. 6 is a graph showing cycle-life characteristics of the rechargeable lithium battery cells according to Example 2 and Comparative Example 2, FIG. 7 is a graph showing cycle-life characteristics of the rechargeable lithium battery cells according to Examples 1, 3 and 4, FIG. 8 is a graph showing cycle-life characteristics of the rechargeable lithium battery cells according to Examples 3, 5 and 6, and FIG. 9 is a graph showing cycle-life characteristics of the rechargeable lithium battery cells according to Example 1 and Comparative Examples 1, 3 and 5.

Referring to FIG. 6, Example 2, which was manufactured by adding lithium triflate and fluoroethylene carbonate to the electrolyte solution, showed excellent cycle-life characteristics as compared with Comparative Example 2, which was manufactured without adding fluoroethylene carbonate to the electrolyte solution (the electrolyte solution did not include fluoroethylene carbonate).

In addition, referring to FIGS. 7 and 8, Examples 1 and 3 to 6 showed excellent cycle-life characteristics. For example, an optimal or suitable amount of the lithium triflate may be obtained through comparison of Examples 1, 3 and 4, and an optimal or suitable mixture ratio of the lithium triflate and the fluoroethylene carbonate may be obtained through comparison of Examples 3, 5 and 6.

Referring to FIG. 9, Example 1 showed remarkably improved cycle-life characteristics as compared with Comparative Example 1, in which no lithium triflate was added to the electrolyte solution of the rechargeable lithium battery cell using the Si-based material as the negative active material. In addition, Comparative Example 5, in which no lithium triflate and fluoroethylene carbonate were added to the electrolyte solution, showed a little improved cycle-life characteristics as compared with Comparative Example 3, in which no lithium triflate was added to the electrolyte solution of the rechargeable lithium battery cell using graphite as the negative active material. In other words, when an electrolyte solution prepared by adding lithium triflate and fluoroethylene carbonate was applied to a battery cell using a Si-based material instead of graphite as a negative active material, an effect of improving cycle-life was much larger.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable lithium battery comprising:
   a negative electrode comprising a negative active material comprising a Si-based material;

a positive electrode; and an electrolyte comprising a lithium salt, an organic solvent, and an additive comprising lithium triflate and fluoroethylene carbonate, wherein the lithium triflate is included in the electrolyte in an amount of about 1 part by weight to about 7 parts by weight based on 100 parts by weight of the organic solvent.

2. The rechargeable lithium battery of claim 1, wherein the lithium triflate is included in the electrolyte in an amount of about 3 parts by weight to about 5 parts by weight based on 100 parts by weight of the organic solvent.

3. The rechargeable lithium battery of claim 1, wherein the fluoroethylene carbonate is included in the electrolyte in an amount of about 5 parts by weight to 20 parts by weight based on 100 parts by weight of the organic solvent.

4. The rechargeable lithium battery of claim 1, wherein the fluoroethylene carbonate is included in the electrolyte in an amount of about 10 parts by weight to 20 parts by weight based on 100 parts by weight of the organic solvent.

5. The rechargeable lithium battery of claim 1, wherein a weight ratio of the lithium triflate to the fluoroethylene carbonate is about 1:2 to about 1:10.

6. The rechargeable lithium battery of claim 1, wherein the Si-based material comprises Si, $SiO_x$, a Si—Y alloy, a Si—C composite, or a combination thereof, wherein $0<x\leq2$ and Y is selected from an alkali metal, an alkaline-earth metal, Group 13 to 16 elements, a transition metal, a rare earth element, and a combination thereof, but not Si.

7. A rechargeable lithium battery comprising:

a negative electrode comprising a negative active material comprising a Si-based material;

a positive electrode; and an electrolyte comprising a lithium salt, an organic solvent, and an additive comprising lithium triflate and fluoroethylene carbonate, wherein the fluoroethylene carbonate is included in the electrolyte in an amount of about 5 parts by weight to 10 parts by weight based on 100 parts by weight of the organic solvent, and wherein the lithium triflate is included in the electrolyte in an amount of about 1 part by weight to about 7 parts by weight based on 100 parts by weight of the organic solvent.

8. The rechargeable lithium battery of claim 1, wherein the fluoroethylene carbonate is included in the electrolyte in an amount of about 5 parts by weight to about 10 parts by weight based on 100 parts by weight of the organic solvent.

* * * * *